United States Patent Office 3,229,698
Patented Jan. 18, 1966

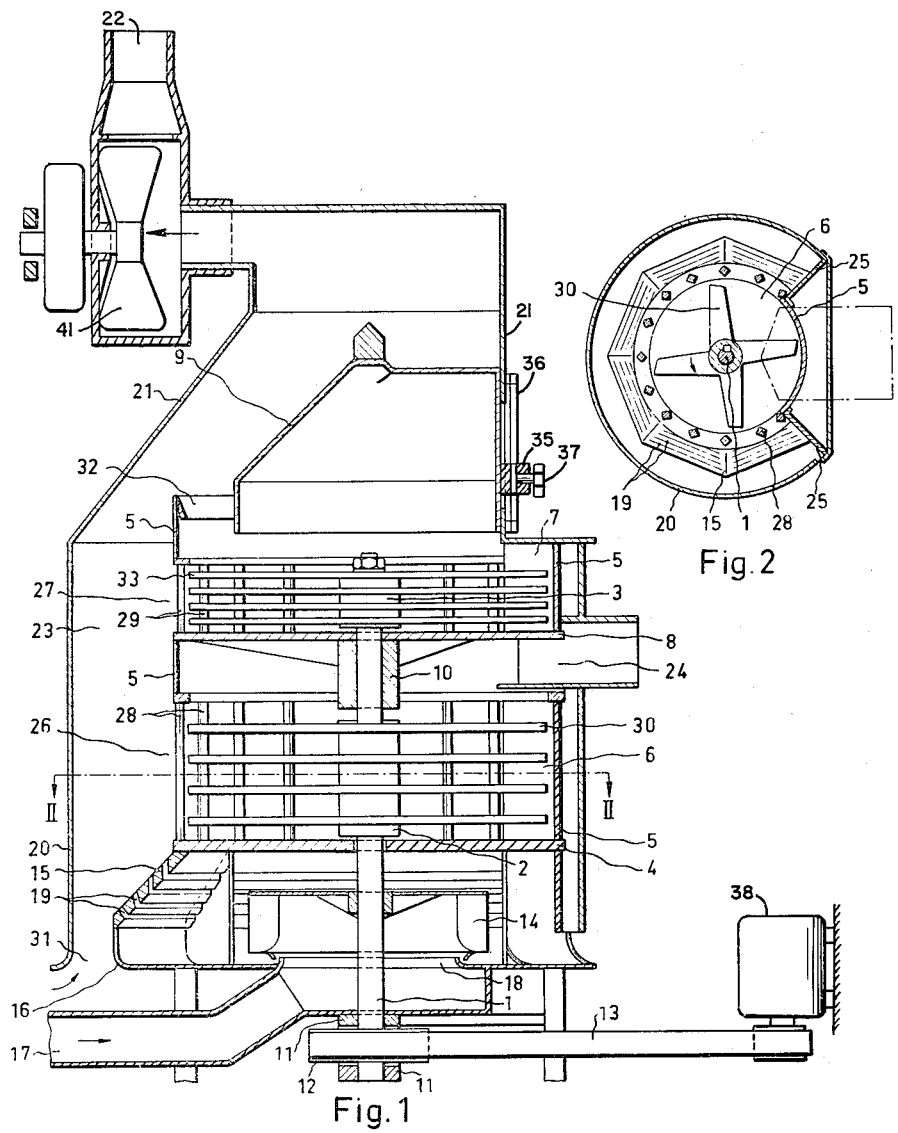

3,229,698
MACHINE FOR THRESHING TOBACCO AND SEPARATING THE TOBACCO THRESHED
Arne G. Johansson, Vallingby, and Olof G. Karlsson, Stockholm, Sweden, assignors to Arenco Aktiebolag, Vallingby, Sweden
Filed Mar. 19, 1964, Ser. No. 353,181
Claims priority, application Sweden, May 16, 1963, 5,419/63
27 Claims. (Cl. 131—146)

The present invention relates to a machine for threshing tobacco leaves and separating the tobacco threshed, comprising a threshing chamber having an opening for the supply of tobacco leaves in which chamber a rotating threshing drum is journalled and which chamber is connected, by a outlet opening provided with a grid, directly to a separating chamber in which air flows upwards.

A known machine of this kind has a threshing drum, rotating on a horizontally journalled shaft. The threshing drum has a relatively small diameter and a great axial length, and the tobacco leaves are threshed between knives, cams or the like, secured to the threshing drum, and the grid of the threshing chamber. A disadvantage of this machine among others is that the tobacco threshed will often be thrown into the separating chamber in clumps, partly in consequence of the inconsiderable extension of the outlet opening in the peripheral direction of the drum, and hence the separating is incomplete.

It has also proved to be necessary to undertake the threshing in two or more steps with differently dimensioned threshing drums, e.g., one coarse thresher and one fine thresher. In known machines this has been effected by providing belt conveyors or other means of conveyance, which transmit the tobacco threshed between threshing drums, arranged after each other or beside each other, possibly secured to the same shaft. These machines are particularly bulky and complicated, and the disadvantage of the frequently throwing out of tobacco in clumps into the separating chamber at the several threshing drums remains.

According to the present invention the above-mentioned disadvantages have been removed, and a very simple and compact machine has been obtained in that the threshing drum is secured to a vertically journalled driven shaft, and that the separating chamber includes the annular spacing between the outlet grid opening and an outer substantially tubular casing enclosing the threshing chamber, which spacing extends around all or nearly all the periphery of the threshing chamber. Hereby the tobacco threshed is thrown out from the threshing chamber in a substantially radial direction through the outlet opening extending around all or nearly all the periphery of the threshing chamber, and the tobacco is entering into the separating chamber in a direction of motion perpendicular to the direction of the air flowing upwardly in the separating chamber. These circumstances have proved to bring about a considerably more even distribution of the threshed tobacco in the separating chamber, and accordingly an improved separating and an increased capacity are obtained, even if only a single threshing and separating step is used.

The invention also enables the arrangement of more separating and threshing steps without the use of special means of conveyance between the different steps.

The invention is illustrated in the attached drawing in which

FIGURE 1 is a vertical projection in outline, partly in section, of an embodiment exemplifying the invention, and FIGURE 2 is a horizontal section along the line II—II in FIGURE 1 on a reduced scale.

The machine shown in the drawing has two threshing drums 2, 3 secured to a common vertical shaft 1 the lower one 2 of which drums is designed as a coarse threshing drum and the upper one as a fine threshing drum. The threshing drums are fit in a threshing chamber having a fixedly mounted tubular casing 5 provided with a bottom 4 which casing is coaxial with the shaft 1 and is divided into an underlying coarse threshing chamber 6 and an upper fine threshing chamber 7 by a fixedly mounted partition 8. An upwardly tapered cap 9 projects into the open top end of the chamber 7, said cap being dimensioned such that an arc-shaped spacing is formed between the cap 9 and the casing 5 of the chamber 7. The shaft 1 to which the threshing drums 2 and 3 are secured is journalled in an upper bearing 10 connected to the partition 8 and in a bearing 11 secured to the bottom of the stand of the machine at which bearing a belt pulley 12, driven by a motor 38 and a belt 13, is secured to the shaft. Between the threshing drum 2 and the pulley 12 there is an impeller 14 secured to the shaft 1 in a ventilator chamber comprising the bottom 4, a substantially arc-shaped wall portion 15 sloping out into the separating chamber and a bottom cover 16 provided with a suction duct 17 connected to a suction port 18.

The wall portion 15 is provided with openings 19 through which air is blown into a vertical separating chamber 23, formed by the spacing between the bottom cover 16, the wall portion 15, the casing 5, the cap 9 and a housing enclosing all these parts consisting of a substantially tubular casing 20 extending from the bottom cover 16 to the top of the fine threshing chamber 7, which casing transcends to a substantially tapered portion 21 extending above the top of the cap 9, where an outlet opening 22 for air and separated tobacco is arranged.

In the case of using only one threshing drum the chamber 23 can extend around the whole periphery of the threshing chamber. The threshing chamber is then provided with an outlet opening for the tobacco threshed likewise extending around the whole periphery of the threshing chamber.

When using two threshing drums 2, 3 as in the embodiment shown in FIGS. 1 and 2 the tobacco is suitably supplied through an opening 24 in the casing 5 of the coarse threshing chamber slightly above the coarse threshing drum 2. In order to give the separating chamber a constant cross section area all along the height of the casing 5 there are two radially directed vertical walls 25 limiting the separating chamber on each side of the opening. The outlet openings 26, 27 of the coarse and fine threshing chambers, respectively having grids in the form of vertical bars 28, 29, respectively, will, thus, extend along the angle of 270° of the whole periphery of the threshing chambers.

When supplying tobacco leaves through the opening 24 by means of a conveyor, not shown, the leaves fall into the coarse threshing chamber 6, where they are threshed between the bars 28 and the rotating threshing drum 2, here provided with four four-bladed knives 30. The tobacco threshed is thrown through the outlet opening 26 into the separating chamber 23, where an upward flow of air carries all lighter leaf portions, while heavier leaf portions, substantially pure stalks and vein portions, fall down and pass by the flows of air from the openings 19 out of the separating chamber through an annular aperture 31 between the casing 20 and the bottom cover 16. The exhaustion of air through the outlet opening 22 by means of a fan 41 is so adapted that through the aperture 31 there is a suction of air having such a speed that only stalks and vein portions with a decided density can fall against the flow of air and out of the separating chamber in the course of which the flows of air from the openings 19 contribute to distribute the tobacco evenly in the chamber above the aperture 31.

Lighter leaf portions, as completely deveined leaf portions and leaf portions with remaining vein portions, are carried by the flow of air in the separating chamber 23 up to the top of the chamber, where they are led against the cap 9 by the tapered portion 21. Here another separating of the tobacco is obtained in that leaf portions with remaining vein portions fall against the cap 9 and the spacing between the cap and the casing 5, which spacing has the reference number 32, while the lighted deveined leaf portions follow the flow of air out through the opening 22. To obtain this effect the speed of the air in this part of the separating chamber is adjustable by the cap 9 being movable in the vertical direction and lockable in a desired position by means of the slide 35, the vertical bar 36, respectively fixed to the cap 9 and the portion 21, having an opening for the slide along the bar, and a screw 37 in the slide, engaging with the bar.

The leaf portions having remaining vein portions fall through the opening 32 into the fine threshing chamber 7, where another threshing operation is performed between the bars 29 and the fine threshing drum 3 especially dimensioned for fine threshing and having four four-bladed knives 33. In this step threshed tobacco is again thrown into the chamber 23 whereby pure vein portions will fall downwardly to the aperture 31, completely deveined leaf portions will follow the flow of air in the chamber out through the opening 22, and leaf portions having remaining vein portions are again fed back to the fine threshing chamber 7 until a complete threshing has been obtained.

Experiments done have proved that a good result can be obtained by threshing and separating, each in a single step, that is, by using a single threshing drum 2 without feeding back tobacco threshed through the opening 32. In that case the tobacco leaves can be supplied to the top of the threshing chamber thus permitting the separating chamber and the outlet opening to extend around the whole periphery of the threshing chamber. Such a supply of the tobacco leaves enables of course also a separating in two steps, that is, feeding back of incompletely threshed tobacco to the threshing chamber is possible.

What is claimed is:

1. A machine for threshing tobacco and separating the tobacco threshed, comprising a casing, a wall forming a threshing chamber in said casing having an opening for the supply of tobacco leaves, a rotating threshing drum in said chamber, a driven vertically journalled shaft to which said threshing drum is secured, bearings for said shaft, a motor for driving said drum, a separating chamber communicating with an outlet opening in the wall of said threshing chamber, a grid for said outlet opening, an impeller directing an air stream upwardly carrying the lighter tobacco leaf portions in said separating chamber, and said separating chamber having an annular spacing between said outlet grid opening and said casing enclosing said threshing chamber, said spacing extending around the periphery of said threshing chamber, said casing being a substantially tubular casing for the separating chamber which narrows above the threshing chamber and an upwardly tapered cap having a maximum diameter smaller than the diameter of the threshing chamber is arranged in the narrowing upper portion of the separating chamber coaxially with the threshing chamber, in addition to which the distance between the outer casing and the cap is adapted so that tobacco stems having leaf portions hanging thereon fall down through the annular spacing between the wall of the threshing chamber and the cap.

2. A machine for threshing tobacco and separating the tobacco threshed, comprising a casing, a wall forming a threshing chamber in said casing having an opening for the supply of tobacco leaves, a rotating threshing drum in said chamber, a driven vertically journalled shaft to which said threshing drum is secured, bearings for said shaft, a motor for driving said drum, a separating chamber communicating with an outlet opening in the wall of said threshing chamber, a grid for said outlet opening, an impeller directing an air stream upwardly carrying the lighter tobacco leaf portions in said separating chamber, and said separating chamber having an annular spacing between said outlet grid opening and said casing enclosing said threshing chamber, said spacing extending around the periphery of said threshing chamber, said separating chamber having an inner wall below the threshing chamber, said inner wall having a portion sloping into the separating chamber reducing the cross section area of the separating chamber, and said inner wall portion having openings through which air is blown into the separating chamber along the outside of said outlet grid opening, said casing being a substantially tubular casing for the separating chamber which narrows above the threshing chamber and an upwardly tapered cap having a maximum diameter smaller than the diameter of the threshing chamber is arranged in the narrowing upper portion of the separating chamber coaxially with the threshing chamber, in addition to which the distance between the outer casing and the cap is adapted so that tobacco stems having leaf portions hanging thereon fall down through the annular spacing between the wall of the threshing chamber and the cap.

3. A machine for threshing tobacco and separating the tobacco threshed, comprising a casing, a wall forming a threshing chamber in said casing having an opening for the supply of tobacco leaves, a rotating threshing drum in said chamber, a driven vertically journalled shaft to which said threshing drum is secured, bearings for said shaft, a motor for driving said drum, a separating chamber communicating with an outlet opening in the wall of said threshing chamber, a grid for said outlet opening, an impeller directing an air stream upwardly carrying the lighter tobacco leaf portions in said separating chamber, and said separating chamber having an annular spacing between said outlet grid opening and said casing enclosing said threshing chamber, said spacing extending around the periphery of said threshing chamber, wherein said separating chamber has an inner wall below the threshing chamber and with a wall portion sloping into the separating chamber reducing the cross section area of the separating chamber, which wall portion is provided with openings, and said impeller being secured to the shaft of the threshing drum below the threshing chamber and said casing of the separating chamber narrows above the threshing chamber and an upwardly tapered cap having a maximum diameter smaller than the diameter of the threshing chamber is arranged in the narrowing upper portion of the separating chamber coaxially with the threshing chamber, in addition to which the distance between the outer casing and the cap is adapted so that tobacco stems having leaf portions hanging thereon fall down through the annular spacing between the wall of the threshing chamber and the cap.

4. A machine as set forth in claim 1 wherein said cap is slidingly journalled in the vertical direction.

5. A machine as set forth in claim 2 wherein said cap is slidingly journalled in the vertical direction.

6. A machine as set forth in claim 3, wherein said cap is slidingly journalled in the vertical direction.

7. A machine for threshing tobacco and separating the tobacco threshed, comprising a casing, a wall forming a threshing chamber in said casing having an opening for the supply of tobacco leaves, a rotating threshing drum in said chamber, a driven vertically journalled shaft to which said threshing drum is secured, bearings for said shaft, a motor for driving said drum, a separating chamber communicating with an outlet opening in the wall of said threshing chamber, a grid for said outlet opening, an impeller directing an air stream upwardly carrying the lighter tobacco leaf portions in said separating chamber, and said separating chamber having an annular spacing between said outlet grid opening and said casing enclosing said threshing chamber, said spacing extending around the periphery of said threshing chamber, wherein said casing comprises an outer substantially tubular casing which narrows above the threshing chamber and an upwardly tapered cap having a maximum diameter smaller than the diameter of the threshing chamber is arranged in the narrowing upper portion of the separating chamber, in addition to which the distance between the outer casing and the cap is adapted so that the tobacco stems having leaf portions hanging thereon fall down through the annular spacing between the wall of the threshing chamber and the cap and in that the threshing chamber is provided with an underlying coarse threshing chamber and thereabove a fine threshing chamber separated from the former and having a threshing drum secured to the same shaft as the threshing drum of the coarse threshing chamber.

8. A machine for threshing tobacco and separating the tobacco threshed, comprising a casing, a wall forming a threshing chamber in said casing having an opening for the supply of tobacco leaves, a rotating threshing drum in said chamber, a driven vertically journalled shaft to which said threshing drum is secured, bearings for said shaft, a motor for driving said drum, a separating chamber communicating with an outlet opening in the wall of said threshing chamber, a grid for said outlet opening, an impeller directing an air stream upwardly carrying the lighter tobacco leaf portions in said separating chamber, and said separating chamber having an annular spacing between said outlet grid opening and said casing enclosing said threshing chamber, said spacing extending around the periphery of said threshing chamber, said separating chamber having an inner wall below the threshing chamber, said inner wall having a portion sloping into the separating chamber reducing the cross section area of the separating chamber, and said inner wall portion having openings through which air is blown into the separating chamber along the outside of said outlet grid opening, wherein said casing comprises an outer substantially tubular casing of the separating chamber which narrows above the threshing chamber and an upwardly tapered cap having a maximum diameter smaller than the diameter of the threshing chamber is arranged in the narrowing upper portion of the separating chamber coaxially with the threshing chamber, in addition to which the distance between the outer casing and the cap is adapted so that the tobacco stems having leaf portions hanging thereon fall down through the annular spacing between the wall of the threshing chamber and the cap and in that the threshing chamber is provided with an underlying coarse threshing chamber and thereabove a fine threshing chamber separated from the former and having a threshing drum secured to the same shaft as the threshing drum of the coarse threshing chamber.

9. A machine as set forth in claim 1 wherein said cap is slidingly journalled in the vertical direction and the threshing chamber is provided with an underlying coarse threshing chamber and thereabove a fine threshing chamber separated from the former and having a threshing drum secured to the same shaft as the threshing drum of the coarse threshing chamber.

10. A machine as set forth in claim 2 wherein said cap is slidingly journalled in the vertical direction and said threshing chamber is provided with an underlying coarse threshing chamber and thereabove a fine threshing chamber separated from the former and having a threshing drum secured to the same shaft as the threshing drum of the coarse threshing chamber.

11. A machine as set forth in claim 3 wherein said cap is slidingly journalled in the vertical direction and the threshing chamber is provided with an underlying coarse threshing chamber and thereabove a fine threshing chamber separated from the former and having a threshing drum secured to the same shaft as the threshing drum of the coarse threshing chamber.

12. A machine for threshing tobacco and separating the tobacco threshed, comprising a threshing chamber, having a tubular wall and an opening for the supply of tobacco leaves, a rotating threshing drum in said threshing chamber, a vertical shaft to which said drum is attached, bearings for a vertical journalling of said shaft, a motor driving said shaft, a separating chamber communicating with an outlet opening in the wall of said threshing chamber, a grid for said outlet opening, means including fans for directing a vertical air stream upwardly in said separating chamber carrying the lighter tobacco leaf portions in said separating chamber and an outer substantially tubular casing enclosing said wall of said threshing chamber, said casing having an exhaustion opening for the outlet of air and separated tobacco above said threshing chamber, said separating chamber including an annular spacing between said outlet grid opening and said casing and extending around at least the major part of the periphery of said threshing chamber.

13. A machine according to claim 12 wherein said separating chamber below said threshing chamber has a wall portion sloping into said separating chamber reducing the cross section area of said separating chamber, which wall portion is provided with small openings and one of said fans is an impeller secured to the rotating shaft of said threshing drum below said threshing chamber, which is provided with an underlying coarse threshing chamber and thereabove a fine threshing chamber, separated from the former and having a threshing drum secured to the same shaft as the threshing drum of said coarse threshing chamber.

14. A machine according to claim 12 wherein the outer substantially tubular casing of said separating chamber narrows above said threshing chamber and an upwardly tapered cap having a maximum diameter smaller than the diameter of said threshing chamber is arranged in the narrowing upper portion of said separating chamber, in addition to which the distance between said outer casing and said cap is adapted so that the tobacco stems having leaf portions hanging thereon fall down through the annular spacing between the wall of said threshing chamber and said cap and that said threshing chamber is provided with an underlying coarse threshing chamber and thereabove a fine threshing chamber, separated from the former and having a threshing drum secured to the same shaft as the threshing drum of said coarse theshing chamber.

15. A machine according to claim 12 wherein said separating chamber below said threshing chamber has a wall portion sloping into said separating chamber reducing the cross sectional area of said separating chamber, which wall portion is provided with small openings, through which air is blown into said separating chamber along the outside of said outlet grid opening, and one of said fans is an impeller secured to the rotating shaft of said threshing drum below said threshing chamber for blowing air through the openings of said sloping wall portion.

16. A machine according to claim 15 wherein the outer substantially tubular casing of said separating chamber narrows above said threshing chamber and an upwardly tapered cap having a maximum diameter smaller than the diameter of said threshing chamber is arranged in the narrowing upper portion of said separating chamber coaxially with said threshing chamber, in addition to which the distance between said outer casing and said cap is adapted so that the tobacco stems having leaf portions hanging thereon fall down through the annular spacing between the wall of said threshing chamber and said cap, and that said threshing chamber is provided with an underlying coarse threshing chamber and thereabove a fine threshing chamber, separated from the former and having a threshing drum secured to the same shaft as the threshing drum of said coarse threshing chamber.

17. A machine according to claim 15 wherein the outer substantially tubular casing of said separating chamber narrows above said threshing chamber and an upwardly tapered cap having a maximum diameter smaller than the diameter of said threshing chamber is arranged in the narrowing upper portion of said separating chamber coaxially with said threshing chamber, in addition to which the distance between said outer casing and said cap is adapted so that tobacco stems having leaf portions hanging thereon fall down through the annular spacing between the wall of said threshing chamber and said cap.

18. A machine according to claim 17 wherein said cap is slidingly journalled in the vertical direction.

19. A machine according to claim 17 wherein said cap is slidingly journalled in the vertical direction and said threshing chamber is provided with an underlying coarse threshing chamber and thereabove a fine threshing chamber, separated from the former and having a threshing drum secured to the same shaft as the threshing drum of said coarse threshing chamber.

20. A machine according to claim 12 wherein said outer substantially tubular casing of sad separating chamber narrows above said threshing chamber and an upwardly tapered cap having a maximum diameter smaller than the diameter of said threshing chamber is arranged in the narrowing upper portion of said separating chamber coaxially with said threshing chamber, in addition to which the distance between said outer casing and said cap is adapted so that tobacco stems having leaf portions hanging thereon fall down through the annular spacing between the wall of said threshing chamber and said cap.

21. A machine according to claim 20 wherein said cap is slidingly journalled in the vertical direction.

22. A machine according to claim 20 wherein said cap is slidingly journalled in the vertical direction and said threshing chamber is provided with an underlying coarse threshing chamber and thereabove a fine threshing chamber, separated from the former and having a threshing drum secured to the same shaft as the threshing drum of said coarse threshing chamber.

23. A machine according to claim 12 wherein said separating chamber below said threshing chamber has a wall portion sloping into said separating chamber reducing the cross section area of said separating chamber, which wall portion is provided with small openings and one of said fans is an impeller secured to the rotating shaft of said threshing drum below said threshing chamber and that the outer substantially tubular casing of said separating chamber narrows above said threshing chamber and an upwardly tapered cap having a maximum diameter smaller than the diameter of said threshing chamber is arranged in the narrowing upper portion of said separating chamber coaxially with said threshing chamber, in addition to which the distance between said outer casing and said cap is adapted so that tobacco stems having leaf portions hanging thereon fall down through the annular spacing between the wall of said threshing chamber and said cap.

24. A machine according to claim 23 wherein said cap is slidingly journalled in the vertical direction.

25. A machine according to claim 23 wherein said cap is slidingly journalled in the vertical direction and said threshing chamber is provided with an underlying coarse threshing chamber and thereabove a fine threshing chamber, separated from the former and having a threshing drum secured to the same shaft as the threshing drum of said coarse threshing chamber.

26. A machine for threshing tobacco and separating the tobacco threshed, comprising a threshing chamber, having a tubular wall and an opening for the supply of tobacco leaves, a first rotating threshing drum in said threshing chamber, a vertical shaft to which said drum is attached, bearings for a vertical journalling of said shaft, a motor driving said shaft, a separating chamber communicating with an outlet opening in the wall of said threshing chamber, a grid for said outlet opening, means including fans for directing an air stream upwardly carrying the lighter leaf portions in said separating chamber and an outer substantially tubular casing enclosing said wall of said threshing chamber having an annular spacing between said outlet opening and said casing and extending around at least the major part of the periphery of said threshing chamber, said threshing chamber comprising an underlying coarse threshing chamber and thereabove a fine threshing chamber separated from the former and having a second threshing drum secured to said shaft for said fine threshing chamber.

27. A machine according to claim 26 wherein said separating chamber below said coarse threshing chamber has a wall portion sloping into said separating chamber reducing the cross sectional area of said separating chamber, said wall portion having small openings, through which air is blown into said separating chamber along the outside of said outlet grid opening, and one of said fans is an impeller secured to said shaft below said coarse threshing chamber for blowing air through the openings of said sloping wall portion.

References Cited by the Examiner

UNITED STATES PATENTS

| | | | |
|---|---|---|---|
| 1,024,832 | 4/1912 | Cox | 241—51 |
| 1,977,771 | 10/1934 | McMahan | 241—51 |
| 2,050,765 | 8/1936 | Rundell | 131—146 X |
| 2,474,314 | 6/1949 | Koehne | 241—51 X |
| 3,046,998 | 7/1962 | Mortimer | 131—146 |

FOREIGN PATENTS

| | | |
|---|---|---|
| 1,107,574 | 5/1961 | Germany. |
| 719,210 | 11/1914 | Great Britain. |

SAMUEL KOREN, *Primary Examiner.*